May 14, 1968  H. J. BLONDE ET AL  3,382,879
VALVE DEVICE FOR CONTROLLING EXHAUST GASES
Filed Feb. 14, 1966  2 Sheets-Sheet 1
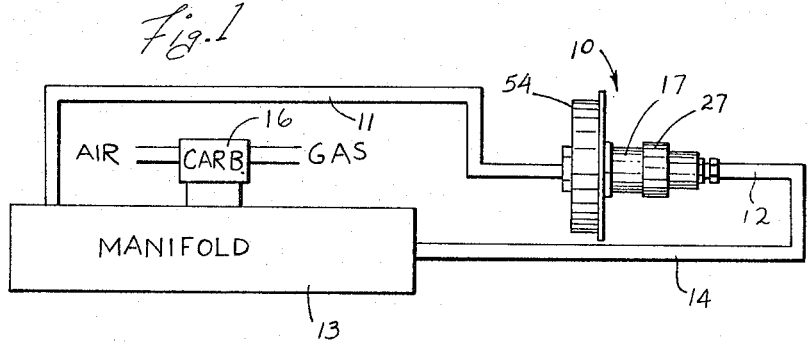
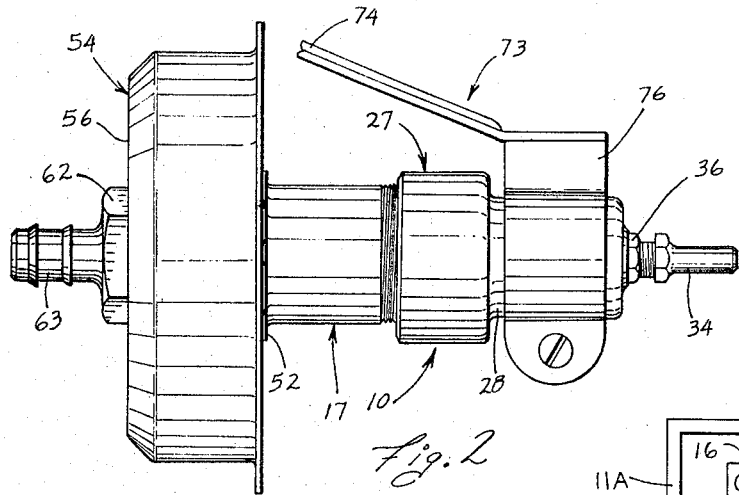
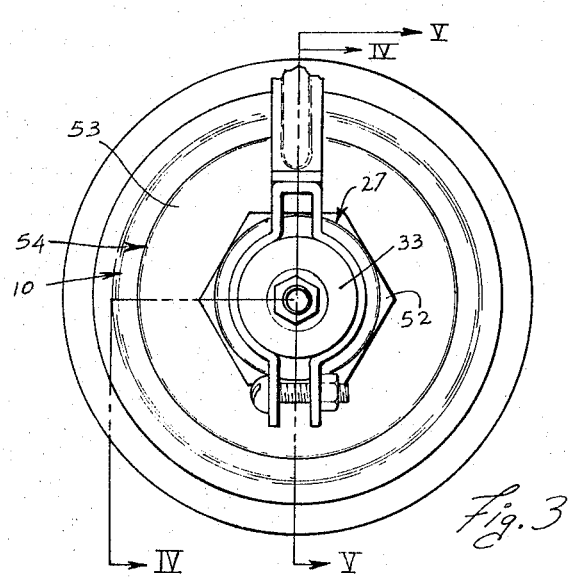
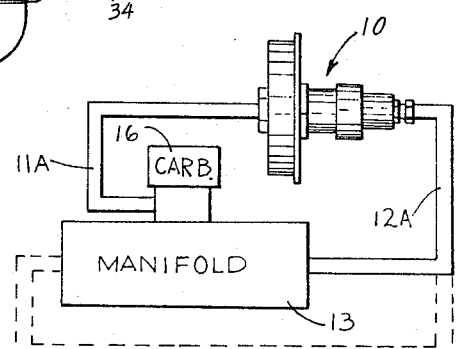
INVENTORS
HOWARD J. BLONDE
BY JOHN P. HILL
Woodhams, Blanchard & Flynn
ATTORNEYS

United States Patent Office

3,382,879
Patented May 14, 1968

3,382,879
VALVE DEVICE FOR CONTROLLING
EXHAUST GASES
Howard J. Blonde, White Pigeon Township, St. Joseph
County, and John P. Hill, Detroit, Mich., assignors to
Blonde Products Inc., Sturgis, Mich., a corporation of
Michigan
Filed Feb. 14, 1966, Ser. No. 526,995
6 Claims. (Cl. 123—119)

ABSTRACT OF THE DISCLOSURE

A valve device having two piston chambers and interconnected pistons disposed respectively within said chambers, said chambers also being connected to the manifold of a combustion engine. The valve device has resiliently flexible means urging the piston means into positions where one piston blocks the flow of ambient air into the manifold. However, when the manifold pressure drops a predetermined amount, the resilient means is overpowered by ambient pressure and ambient air can then flow into the manifold until the manifold pressure returns to a predetermined value.

---

This invention relates in general to a valve device for minimizing the occurrence of, hence the adverse affects from, an excessive vacuum in the manifold of a combustion engine, especially during the deceleration of the engine, whereby excessive amounts of hydrocarbons are drawn into the manifold during deceleration and, accordingly, are thereafter exhausted from the engine in an unburned, noxious state.

It is an understatement to say that very nearly everyone who is associated with the manufacture and sale of automotive vehicles, and/or is concerned with the pollution of the air which purportedly results to a considerable extent from the exhaust fumes discharged by said vehicles, has been keenly aware of the need for a device which will at least be able to reduce the noxious content of the exhause gases from a vehicle engine. It has long since been determined that the share of the air pollution problem attributed to the fumes from automobile engines results primarily from the discharge of unburned hydrocarbons. Much money and many hours of research have been devoted to the solution of this problem, and numerous attempts have been made to market a device allegedly capable of reducing the pollution problem, as applied to internal combustion engines. However, insofar as I am aware, these attempts have been largely unsuccessful in that they have not produced satisfactory results.

Specific reference is made herein to automobile or vehicle engines because the invention developed from efforts made to minimize the pollution in the exhaust gases from such engines. However, the invention can be adapted to any internal combustion engines for the same purpose.

In the course of examining this problem, it became apparent to us that the most serious source of the problem was not being attacked or, possibly, was not even recognized. That is, most of the efforts to overcome the problem have been directed to the elimination of the hydrocarbons from the exhaust gases rather than to a reduction in the creation of the hydrocarbons. For example, many devices have been developed for effecting recirculation of part or all of the exhaust gases, but this approach does not recognize that combustion engines do not discharge the same amount of unburned hydrocarbons during all phases of their operation.

It has been determined, as the result of tests, that the discharge of unburned hydrocarbons from an automobile engine is about three times as great during deceleration as it is during acceleration, and said discharge is about twice as great during deceleration as it is during idling. In other words, the most unfavorable discharge conditions are most likely to occur more frequently in city driving, where the resulting air pollution has become the most alarming and serious. Accordingly, it became apparent, and laboratory tests merely confirmed our belief, that a substantial reduction in air pollution could be achieved by reducing the increase in unburned hydrocarbons during deceleration.

Upon further investigation, it was discovered that excessively low pressures could develop in the manifold of the engine during deceleration, due primarily to the fact that the throttle plates are generally closed during deceleration and the engine is still being driven by the momentum of the car. This excessively low manifold pressure tends to draw gasoline from the carburetor and oil past the piston rings, which gasoline and oil are not burned and, therefore, are discharged through the exhaust valves. The pollution problem increases with the age of the vehicle, because of the increased leakage past the piston rings and intake valves.

It was found that the excessively low pressure (or high vacuum) created during deceleration was of no value to the other functions of the engine. That is, for example, adequate vacuum is provided for normal brake operation as long as the manifold pressure does not materially exceed the normal pressure (about 17″ Hg) when the engine is idling. However, it was found that the manifold pressure dropped during deceleration to a value considerably lower than the idling pressure in all circumstances of normal operation.

Accordingly, a primary object of this invention was the provision of a valve device whereby the excessively low manifold pressure, which occur during deceleration of an automobile engine, can be relieved before it draws unneeded amounts of hydrocarbons into the manifold of the engine, without in any way affecting adversely the vacuum pressure required to perform standard functions in the operation of the vehicle.

A further object of this invention was the provision of a device for causing the flow of atmospheric air into the manifold of an internal combustion, automobile engine when the manifold pressure drops below a predetermined value and thereafter maintaining said flow of atmospheric air into said manifold until the pressure rises a selected, substantial amount above said predetermined value thereof, after which said flow is automatically terminated.

A further object of this invention was the provision of a valve device, as aforesaid, which could be connected into any conventional internal combustion engine normally used on a vehicle, which could be built and installed inexpensively, which would be completely automatic in its operation, which could be adapted by a minor adjustment thereof for use on engines having a variety of vacuum pressure requirements, which would be capable of long useful operations without maintenance, and which would greatly reduce the creation of noxious exhaust gases, particularly at the times when the greatest volumes of such noxious gases are produced.

A further object of this invention was the provision of a valve device, as aforesaid, which would not adversely affect the operation of the combustion engine during its normal periods of idling, accelerating and cruising and, in fact, would not affect the decelerating period of the engine except to relieve the excessive vacuum pressure and, as a result thereof, reduce the discharge of noxious gases from the engine.

Other objects and purposes of this invention will become apparent to persons familiar with the problems developed by the noxious gases discharged from internal combustion engines when reading the following descriptive material and examining the accompanying drawings, in which:

FIGURE 1 is a schematic view of a part of the fuel system of an automobile engine embodying the invention.

FIGURE 2 is a side elevational view of a valve device embodying the invention.

FIGURE 3 is an end elevational view of the valve device appearing in FIGURE 2.

FIGURE 6 shows an alternate arrangement for the system embodying the invention.

Figure 4:
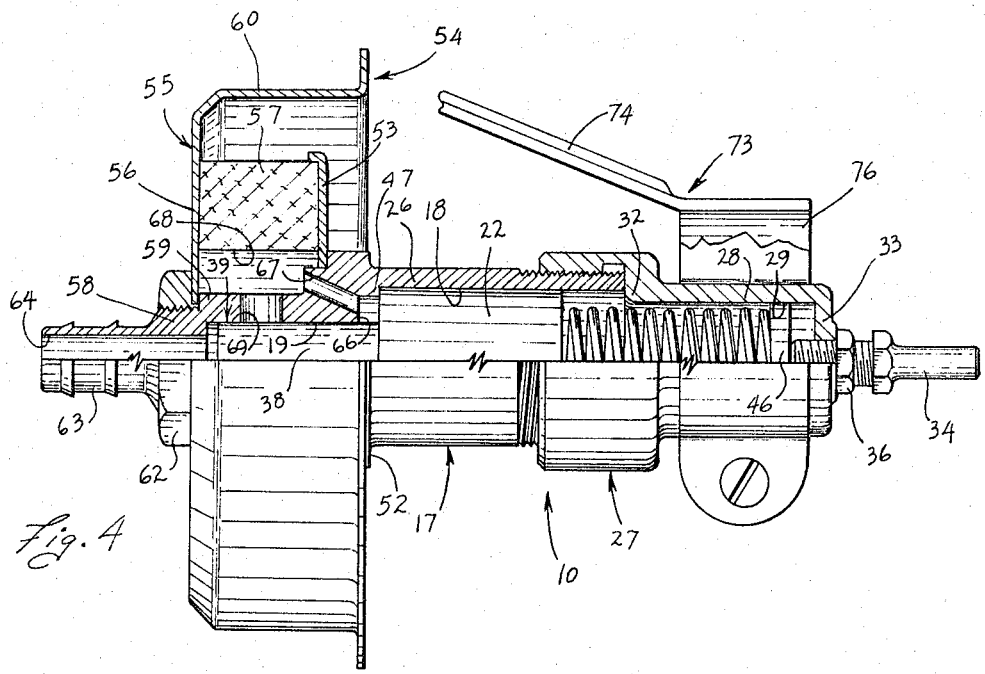
FIGURE 4 is a section view taken along the line IV—IV in FIGURE 3.
Figure 5:
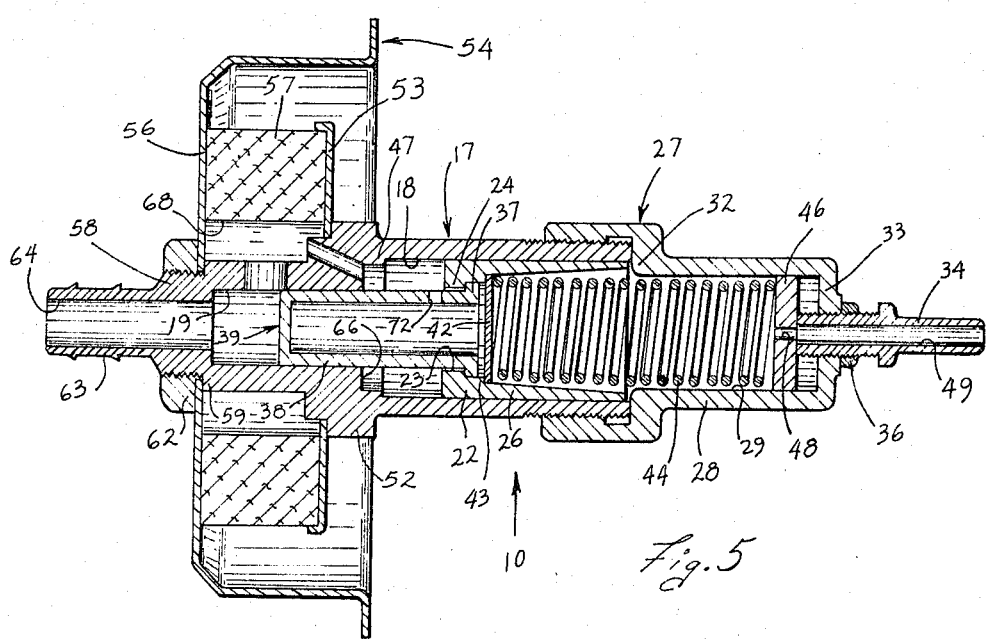
FIGURE 5 is a sectional view taken along the line V—V in FIGURE 3 with parts thereof in positions differing from those shown in FIGURE 4.

For convenience in description, the terms "front," "rear" and words of similar import will have reference to the left and right ends, respectively, of the valve device as appearing in FIGURES 4 and 5. The terms "inner," "outer" and derivatives thereof will have reference to the geometric center of the valve device and parts thereof.

*General construction*

The objects and purposes of the invention, including those set forth above, have been met by providing an apparatus for practicing the method, said apparatus comprising a valve housing having left and right, coaxial and end-to-end valve chambers which communicate with each other and which each have pistons axially slideably disposed therein. Front and rear conduits are connected to the corresponding, remote ends of the valve housing so that they communicate, respectively, with the front and rear piston chambers. The front piston is substantially smaller than the rear piston to permit the use of a relatively strong spring for counterbalancing the difference between normal manifold pressure and atmospheric pressure. Where the spring is weak, the movement of the pistons is not sufficiently positive. A source of ambient air can be connected to the small chamber through a bypass opening located in the wall of the small chamber between the front conduit and the large chamber. Both pistons are urged frontwardly by a resilient member toward positions wherein the small piston blocks the flow of ambient (substantially atmospheric) air into the small piston chamber through the bypass opening. Both conduit means are, at least in effect, connected to the engine manifold so that they promptly sense a decrease in manifold pressure. When a selected decrease occurs, the pistons are moved against the urging of the spring so that atmospheric air can flow through the small chamber into the manifold and increase the manifold pressure.

*Detailed description*

The valve device 10 (FIGURE 1), disclosed for the purposes of illustration, is preferably connected by the conduits 11 and 12 to the opposite ends of the manifold 13 of a conventional automobile engine (not shown) having a carburetor 16. In the alternate arrangement of FIGURE 6, the rear conduit 12A connects to the manifold 13, but the front conduit 11A is connected to the carburetor 16 at a point adjacent the discharge side of the throttle valve in the carburetor. If desired, a second connection between the rear end of the device 10 and the front end of the manifold 13 can be effected by a conduit shown in broken lines at 12B. Thus, it will be seen that the purpose of the invention, which is to relieve promptly an excessive vacuum within the manifold 13, can be accomplished by more than one type of connection between the device 10 and the manifold.

The valve device 10 (FIGURES 2, 4 and 5) includes a preferably cylindrical housing 17 containing a relatively large piston chamber 18 near its rearward end and a relatively small piston chamber 19 near the front end, which chambers communicate with each other at their adjacent ends. A large, substantially cylindrical control piston 22, which is axially slideably disposed within the large chamber 18, has an annular, inwardly projecting flange 24 at its front end defining a coaxial opening 23. The skirt 26 of the piston 22 is substantially shorter than the axial length of the large chamber 18 to permit a substantial axial movement of the piston 22.

An axially elongated end cap 27, which is threadedly mounted upon the rear end of the housing 17, has a reduced portion 28 defining a spring-receiving chamber 29. The reduced portion 28 creates an internal, annular shoulder 32 which not only abuts the rear end of the housing 17, but also provides a positive stop for rearward axial movement of the control piston 22.

The rear end wall 33 of the end cap 27 has a preferably coaxial, threaded opening into which the threaded nipple 34 is received and a lock nut 36 holds the nipple 34 in a selected position whereby adjustment of said nipple 34 can be effected axially of the wall 33, for reasons appearing hereinafter.

The small piston 39 is cup-shaped and extends slideably through the opening 23 defined by the flange 24 on control piston 22. Said small piston 39 has a radially outwardly extending flange 37 at the rear end of its side wall 38 which overlies the front side of the flange 24 to limit frontward movement of the valve piston 39 with respect to the control piston 22. The valve piston 39 can move axially slightly with respect to the control piston 22, as discussed hereinafter.

A sealing disk 42 is seated coaxially within the control piston 22 upon an annular shoulder 43 near to the flange 24, so that there is a small space between the flange 37 and said sealing disk 42 when said flange 37 is bearing against the flange 24. A spiral spring 44 has its front end bearing against the sealing disk 42 and has its rearward end bearing against a ring 46 which in turn bears against the inner end of the nipple 34. The spring 44 is at all times under compression between the sealing disk 42 and the ring 46 whereby said control piston 22 is continuously urged toward the rear end wall 47 of the large chamber 18. The sealing disk 42 is held in tight sealing engagement with the shoulder 43 by a press fit to prevent leakage. A central opening 48 in the ring 46 communicates with the passageway 49 through the nipple 34 which communicates with the conduit 12. Accordingly, by adjusting the position of the nipple 34 with respect to the rear end wall 33, the compression of the spring 44 can also be varied.

The housing 17 has an annular ridge 52 encircling the small chamber 19 adjacent the large chamber 18. The annular side plate 53 of an annular air filtering device 54 bears against the annular ridge 52. Said filtering device 54 includes a cup-shaped side member 55, having an end wall 56, and air filtering material 57, of any convenient type, arranged in an annulus between said side plate 53 and said end wall 56. The peripheral wall 60 is spaced from, and preferably extends axially over and beyond, the filtering material 57 and side plate 53.

The housing 17 has a reduced threaded portion 58 over which the end wall 56 is sleeved and held against the shoulder 59 by a nut 62. The housing 17 has an integral, coaxial nipple 63 which projects beyond the threaded portion 58 for reception of the conduit 11. The passageway 64 through the nipple 63 communicates with the front end of the small piston chamber 19.

The front end wall 47 of the chamber 18 has an annular recess 66 which opens into the small piston chamber 19 and the large chamber 18 and is coaxial therewith. A control passage 67 extends through the housing 17 in a substantially lengthwise direction so that it communicates at one end with the annular space 68 defined between the side plate 53, the end wall 56, the filtering material 57 and the outside of the housing 17. The other end of the control passage 67 communicates with the annular recess 66. A bypass 69 extends substantially radially through the housing 17 so that it communicates between the annular space 68 and the small piston chamber 19 near to, but spaced from, the passageway 64.

The length of the valve piston 39 is such that the side wall 38 thereof completely blocks the bypass 69 when the control piston 22 is in its frontward position of FIGURE 4 and the flange 37 on said valve piston is against the flange 24 of the control piston 22. At the same time, a small bleed opening 72 in the side wall 38 of the valve piston 39 is radially aligned with and communicates with the annular recess 66. When the control piston 22 is in its rearward position (FIGURE 5), then the bypass 69 is substantially unblocked by the side wall 38.

The mounting bracket 73 (FIGURES 2 and 3) includes a support arm 74 connectible to the engine (not shown) with which it is used. Said mounting bracket includes a clamp 76 secured to one end of the support arm 74 and capable of snugly embracing the reduced portion 28 of the end cap 27, whereby the valve device 10 is mounted in a fixed position.

Operation

Under normal circumstances, the parts of the valve device 10 will normally be in their positions of FIGURE 4 when the automobile engine is operating at idling speed, is accelerating, or is operating at normal power settings. Relatively minor retardation of the engine by a slow or minor reduction in the throttle setting will not normally effect the operation of the device 10 of the invention, mainly because the resultant deceleration will not materially reduce the pressure (increase the vacuum) in the manifold. However, when the engine throttle is suddenly or substantially suddenly released so that the throttle plates or valve is closed while the engine is still connected to the propeller shaft of an automobile, the momentum of the vehicle will cause the engine to operate at an r.p.m. whereby excessively low manifold pressures are developed. That is, the source of air (atmosphere), which is normally available to the manifold from the carburetor at such engine speeds, will be cut off by the throttle valve so that a relatively low pressure will be developed in the manifold and promptly thereafter, within the large rearward piston chamber 18, on the rear side (FIGURE 5) of the piston 22. The same pressure drop will also appear at the front end of the small piston chamber 19.

When the pressure within the rearward piston chamber 18 drops a predetermined and adjustable amount, the atmospheric pressure within the annular recess 66 will overpower the vacuum within the small chamber 19 as well as the resistance of the spiral spring 44. Accordingly, the control piston 22, hence the valve piston 39, will be moved rearwardly into the positions of FIGURE 5 whereby atmospheric pressure can now move into the manifold 13 through the bypass 69, the small chamber 19, the passageway 64 and the conduit 11 (FIGURE 1) to increase the pressure in the manifold. The increased manifold pressure is quickly transmitted through the conduit 12 and the passageway 49 (FIGURE 5) to the large chamber 18.

The relative diameters of the pistons 22 and 39, and the strength and compression of the spring 44 are carefully selected so that, when the pressure in chamber 18 reaches a predetermined value, the pistons 22 and 39 will be returned to their positions of FIGURE 4. Thus, the supply of ambient air through the bypass 69 will be cut off by the piston 39.

As indicated in the foregoing paragraph, atmospheric pressure exists within the small piston chamber 19 when the bypass 69 is open. Thus, the pressure must rise within the large piston chamber 18 on the rear side of piston 22 until the difference between atmospheric pressure and the pressure within the large chamber is slightly less than the pressure provided by the spiral spring 44, whereby the valves 22 and 39 are moved frontwardly into their FIGURE 4 positions. Normally, the spring tension of the spiral spring 44 is adjusted by appropriate location of the nipple 34 so that the frontward movement of the control piston 22 and valve piston 39 will occur about at the normal vacuum pressure for the idling speed of the engine.

In on particular embodiment, it was found that a pressure of approximately 17 inches of mercury existed at idling speed. The spring 44 was selected and adjusted so that rearward movement of the control valve 22 would be effected when the manifold pressure dropped to approximately 14 or 15 inches of mercury. With this arrangement, all normal functions relying upon the vacuum pressure could be performed, and the occurrence of an undesirable, low manifold pressure would be prevented without undesirable effects. That is, an excessive vacuum would be relieved before it could draw excessive hydrocarbons into the manifold 13.

It will be seen that, by appropriate selection of spring strength or the adjustment of its compression, and/or by changing the diameters of the piston 22 and 39, substantial changes can be made in the value of the pressure at which the pistons are caused to move rearwardly and/or frontwardly.

It has been found that the device 10 also reduces flooding during cold weather operation. That is, the device opens to increase manifold pressure which drops when the engine is suddenly decelerated or when the choke plates are closed during the warmup period, even though the automobile is not moving.

The device 10 has been designed so that it must close at the vacuum pressure (i.e., 17″ Hg) which is required for normal operation of those devices depending upon vacuum pressure. Furthermore, the device 10 has been designed to sense the drop in manifold pressure without necessitating the flow of the exhaust gases through the device. Thus, contamination and/or corrosion of the device by said exhaust gases, which could quickly and adversely affect the performance of the device, is positively prevented.

Although particular preferred embodiments of the invention have been described above in detail for illustrative purposes, it will be recognized that variations or modifications of such disclosure, which lie within the scope of the appended claims, are fully contemplated.

The embodiments of the invention in which an exclusive property or privilege is claimed are defined as follows:

1. A valve device for relieving a vacuum in the manifold of an automobile engine when the manifold pressure drops below a predetermined value, said manifold being connected to a source of fuel, comprising:

valve housing means defining first and second piston chambers;

first and second piston means axially slidably disposed within said first and second piston chambers, respectively, said piston means being mechanically interconnected and having adjacent and remote axial ends, said first piston means being diametrically larger than said second piston means;

first conduit means directly communicating with and between said manifold and said first piston chamber for continuously subjecting the remote end of said first piston means to the pressure of said manifold;

second conduit means communicating with and between said manifold and said second piston chamber;

first passage means communicating between substantially ambient air and said first piston chamber for continuously subjecting the adjacent end of said first piston means to ambient pressure;

second passage means communicating between substantially ambient air and said second piston chamber; and resilient means urging said first and second piston means into positions wherein said second piston means prevents communication between said second conduit means and said second passage means, the strength of said resilient means being such that said second piston means is moved by said first piston means out of said position when the manifold pressure in said first chamber drops a predetermined amount, whereby ambient air can flow from said second passage means to said second conduit means and into said manifold.

2. A valve device according to claim 1, wherein said first and second piston means are coaxial and substantially cup-shaped, and said first and second piston means have interengageable means permitting small relative movement of said piston means in an axial direction; and
wherein said resilient means is a spiral spring held under compression between the remote end of said first piston means and the opposing end of said first chamber.

3. A valve device according to claim 1, wherein said resilient means is overpowered and said second piston means is moved out of said position when said predetermined amount of pressured drop is in the range of between about one inch and about three inches of mercury, and wherein said second piston means is moved into said position when said manifold pressure is in the range of between sixteen and nineteen inches of mercury.

4. A valve device according to claim 2, wherein the difference in the diameters of said first and second piston means is sufficient to permit the use of a relatively strong spring when said predetermined amount of manifold pressure is in the range of from one to three inches of mercury.

5. A valve device according to claim 2, including spring compression adjustment means mounted on said opposing end of said first chamber and engageable with said spiral spring.

6. A valve device according to claim 2, wherein said first and second piston chambers are substantially coaxial and interconnected;
wherein said first and second conduit means communicate through the opposite axial ends of said housing with said first and second piston chambers, respectively; and
wherein substantially the entire adjacent end of said piston means is continuously exposed to ambient pressure so that the force imposed by said resilient means against said first piston means when said second piston means is in said position is equal to the force of said ambient pressure against said first piston means minus the force of said vacuum pressure in said first piston chamber plus the force of vacuum pressure in the second piston chamber.

References Cited

UNITED STATES PATENTS

| | | | |
|---|---|---|---|
| 2,129,608 | 9/1938 | Vanderpoel | 123—119 |
| 2,944,646 | 7/1960 | Willmer | 123—119 |
| 3,110,295 | 11/1963 | Bendel | 123—119 |
| 3,287,899 | 11/1966 | Bintz | 123—119 |

FOREIGN PATENTS

| | | |
|---|---|---|
| 202,719 | 9/1955 | Australia. |
| 294,455 | 1/1954 | Switzerland. |
| 634,554 | 1/1962 | Canada. |

WENDELL E. BURNS, *Primary Examiner.*